United States Patent [19]
Knolle et al.

[11] 4,173,844
[45] Nov. 13, 1979

[54] LAMINAR SEED CARRIERS AND METHOD OF PREPARING SAME

[75] Inventors: Jürgen C. Knolle, Eschwege; Hans Grimm, Meinhard, both of Fed. Rep. of Germany

[73] Assignee: Saat- und Erntetechnik GmbH, Eschwege, Fed. Rep. of Germany

[21] Appl. No.: 867,335

[22] Filed: Jan. 6, 1978

[51] Int. Cl.² ............................................. A01C 7/04
[52] U.S. Cl. ........................................................ 47/56
[58] Field of Search ................................... 47/56, 9, 58

[56] References Cited

U.S. PATENT DOCUMENTS

| | | | |
|---|---|---|---|
| 1,160,279 | 11/1915 | Gray et al. | 47/56 |
| 2,909,003 | 10/1959 | Marshall | 47/56 |
| 2,976,646 | 3/1961 | Hansen et al. | 47/56 |

FOREIGN PATENT DOCUMENTS

| | | | |
|---|---|---|---|
| 2122318 | 11/1972 | Fed. Rep. of Germany | 47/56 |
| 1582123 | 7/1977 | Fed. Rep. of Germany | 47/56 |
| 488392 | 7/1938 | United Kingdom | 47/56 |
| 699028 | 10/1953 | United Kingdom | 47/56 |
| 867498 | 5/1961 | United Kingdom | 47/56 |

*Primary Examiner*—Robert E. Bagwill
*Attorney, Agent, or Firm*—Scully, Scott, Murphy & Presser

[57] ABSTRACT

A method of preparing a laminar seed carrier in which a support comprising an unsized or lightly sized paper web of tangled short, smooth individual fibres is provided with one or more patches of an adhesive substance, seeds are applied to the patch or patches of adhesive substance, an upper paper web comprising a porous web having a lower weight than the support paper web is placed over the seeds and bonded to the support paper web and is treated with one or more powdered water-storing substances to incorporate the powdered water-storing substances within the pores of the upper paper web. Also provided is a laminar seed carrier comprising an unsized or lightly sized support paper web of tangled short, smooth individual fibres, bearing one or more patches of an adhesive substance upon which seeds are bonded and an upper paper web, comprising a porous web having a lower weight than the support web covering the seeds and being bonded to the support web, the upper paper web having one or more powdered water-storing substances entrapped within its pores.

24 Claims, 4 Drawing Figures

LAMINAR SEED CARRIERS AND METHOD OF PREPARING SAME

BACKGROUND OF THE INVENTION

This invention relates to laminar seed supports which are also known as laminar seed carriers or seed foils and to their preparation.

Laminar seed supports or carriers which consist of superimposed, mechanically united paper surfaces, between which seeds are, in practice, disposed with an irregular distribution are known. These seed carriers have the disadvantage that the plant development progresses in an irregular manner, since sometimes the plants are too close together and as a result an optimum growth of the plants is thereby impeded. Also the loose disposition of the seeds between the layers of paper, allow the seeds to be displaced during transport and handling, whereby the above disadvantages are increased.

The use of paper comprising long fibres also has the disadvantage in that during the germination of the plant the shoot and roots must grow through the paper layers and may therefore be impeded resulting in germination failures and/or retardation of growth.

It has been proposed to apply separate dots of adhesive substance at intervals to paper webs and to use these dots as points of adhesion for seed. When using this procedure, the seeds are dropped onto the paper surface which is moved upwardly and the seeds are retained only on those areas having the dots of adhesive substance. The disadvantage which arises in such a case is that several seed grains are able to stick side by side on any dots, resulting in an irregular and too close spacing of the plants. An additional disadvantage with this operating procedure is that, with the handling of the paper web, the seeds are able to break out as a consequence of the movement, and thereby failures occur.

Insofar as a size or adhesive substance is used according to the prior art for sticking the seeds to a support, the substances used have a slow water-solubility or are insoluble in water and accordingly the germination of seeds embedded within such substances is impeded as water is required for germination.

Seed supports which consist of paper quickly dry out after having been given a thin covering of soil when there is a lack of soil moisture, e.g. when there has been no rain, and the paper quickly regains the strength value existing in the dry state. In this state, the shoots and roots which develop during germination are unable to break through the paper. For a quick germination, it is particularly desirable to provide an extremely thin covering of soil or to omit providing any covering. The contact with the moist soil is consequently extremely restricted. After having been sprayed or after rain, the paper dries out quickly if the water capacity is too low.

German Patent Specification No. 79 129 discloses the production of a laminar seed carrier with super-imposed paper surfaces which are connected by adhesive bonding. According to this proposal, "a small amount of adhesive" is to be applied "to each position", which position "is to receive a seed grain" and "seeds are to be broadcast and trapped onto strips as thus provided with points of adhesion". It also states: "seeds then only remain adhering to the positions which carry adhesive". The statement is made that "when such seed strips are introduced into the soil, the natural or artificially applied moisture of the soil causes a decomposition or disintegration of the paper", so that "a germination of the seeds may occur". Therefore, according to this proposal, water is only to be imbibed into the paper by the moisture of the soil, so that a rapid disintegration of the strip is caused and therefore porous paper should be used as the support. Paper, however, only has a limited water capacity.

German Pat. No. 191,127 proposes the use of a seeding strip consisting of porous paper, such as blotting paper, with depressions for the positioning of the seeds and to stick these seeds in the depressions. German Patent No. 279,745 proposes using two paper layers consisting of fibrous material and to provide one of the layers with a "central line of adhesive material", to stick the seed grains on the said line and thereafter to stick the strips by lateral lines of adhesive.

German Patent No. 306,663 discloses the use of seed strips with perforations at regular intervals, through which the seed grains are drawn by suction. The paper strips are to be coated with rubber or size, so as to fix the seed grains thereon, and thereafter the covering paper is to be stuck thereon. German Patent No. 474,764 also proposes the use of absorbent materials and the use of dextrin as adhesive.

German Patent No. 826,516 is concerned with a method which uses a strip of unsized fibre paper, such as cellulose, cellophane, which "is automatically dissolved by the moisture in the soil". The "anchoring" of the seeds is to be effected by "being turned, folded or gummed therein" and thus this proposal uses only a single paper web.

German Offenlegungsschrift No. 2 164 536 relates to a method of seeding out seeds by means of a strip-like seed carrier which is able to rot away, to which carrier seeds are adhered by spots of adhesive. Paper, cellulose, rottable synthetic plastics material having troughs, are to be used as the support material.

German Offenlegungsschrift 2 150 770 relates to a "spread-out seed carpet" consisting of a base layer provided with binding agents, the seeds which are laid thereon and a covering layer disposed above the seeds. These layers consist of pressed peat, light-weight paper or similar cardboard qualities or of a rottable, porous material. Where the covering layer is not pressed on, without adhesive, an adhesive substance which is quick-drying and does not initiate any germination is to be used, concerning which, however, no details are given.

German Offenlegungsschrift No. 1 582 087 discloses a method in which the seed is bonded with a flat support, onto which is to be pressed a covering which fixes the seeds. The support and covering are to be formed in a substantially similar manner and are to consist of the same material. The seeds are intended to be introduced into depressions in the support. It is also possible for the seeds to be fixed by adhesive bonding. If this is the case, it is necessary to start with a preliminary treatment by which the seeds are made insensitive against a brief supply of moisture from the adhesive. This preliminary treatment consists in a drying procedure. The seeds are protected against moisture by a protective layer. No specific types of paper or adhesives are proposed.

German Offenlegungsschrift No. 1 757 655 relates to the packaging of seeds or seed supports in the form of strips or rolls of paper or similar material. The damaging effect of the adhesives on the seed is disclosed as being a disadvantage as is the use of crepe paper since such paper does not permit the passage of sufficient water and gases. This more recent proposal follows a different procedure. The seed supports are formed without using adhesives and the webs of paper-like material are united by crimping, stamping or heat-sealing in the form of dots or lines, which enclose the seeds. The paper webs are guided through rollers, one of which rollers carries the embossing pattern.

German Offenlegungsschrift No. 2 219 448 discloses a seed strip which, is a flexible, flat support, comprising blotting paper, which is able partially to rot away. A covering of a porous mat of synthetic plastics material is proposed whereby a mat of grown grass which can be rolled up may be produced. Starch paste is proposed as adhesive means.

SUMMARY OF THE INVENTION

It is an object of the present invention to provide a new laminar seed carrier.

According to the present invention there is provided a method of preparing a laminar seed carrier in which a support comprising an unsized or lightly sized paper web of tangled short, smooth individual fibres is provided with one or more patches of an adhesive substance, seeds are applied to the patch or patches of adhesive substance, an upper paper web comprising a porous web having a lower weight than the support paper web is placed over the seeds and bonded to the support paper web and is treated with one or more powdered water-storing substances to incorporate the powdered water-storing substances within the pores of the upper paper web.

Also according to the invention there is provided a laminar seed carrier comprising an unsized or lightly sized support paper web of tangled short, smooth individual fibres, bearing one or more patches of an adhesive substance upon which seeds are bonded and an upper paper web, comprising a porous web having a lower weight than the support web covering the seeds and being bonded to the support web, the upper paper web having one or more powdered water-storing substances entrapped within its pores.

The "laminar seed carrier" of the invention may be of any desired size but is preferably of the size (length and breadth) of seed beds or borders.

The invention provides a seed carrier which is formed from two different paper webs. The seeds are bonded to the support web by an adhesive and the upper web covers the seeds and is bonded to the support. The water capacity of the seed carrier is increased by applying a powder coating of a water-storing substance, preferably simultaneous with the bonding of the upper web.

The combination of the bottom, thin, smooth paper web which is unsized or is only weakly sized, as support of the seed grains, with the upper, lighter, porous paper web for the safe covering of the seed grains until the planting out of the laminar seed carrier, is particularly advantageous. The short fibred, unsized or only weakly sized paper of the botton paper web decomposes in moist conditions achieved by spraying or by the capillary action of the soil humidity and thereby an unimpeded development of the seedling is possible.

The disintegration of the paper and also the germination of the seeds is also enhanced by the action of the water-storing substances which are present in the porous covering paper. After an initial swelling, these substances protect the carrier against a temporary drying out and also assist the contact for the capillary soil moisture thereby ensuring the presence of sufficient moisture for germination.

Suitable adhesive substances for use in the invention, include dextrin or cellulose. These substances are compatible with the germination procedure and provides the important advantage that they quickly dry out initially and also quickly enters into solution with the moisture, and therefore do not inhibit the germination. Preferably the adhesive substance is used in such quantities and with such a solids content that the amount of water applied to the seed carrier is from 1 to 2% by weight based on the total weight of two paper webs and the seeds.

The adhesive substance, particularly when based on dextrin, is also compatible with solutions of plant nutrients, without these latter being precipitated by ions or substances of the cold-saturated solution. Thus the adhesive solution may conveniently be mixed with an aqueous solution of substantially cold-saturated plant nutrients in an amount of from 10 from 30% by weight.

Suitable water-storing substances may be natural, synthetic, organic or inorganic compounds and include alginates, cellulose phosphate starch, bentonite and mixtures thereof. The substances are applied in powder form, preferably simultaneously with the bonding of the paper webs and the particles are trapped in the pores of the upper paper web thereby conferring increased water capacity in the seed carried.

BRIEF DESCRIPTION OF THE DRAWINGS

The foregoing and other objects and advantages of a novel method of preparing a laminar seed carrier and laminar seed carrier pursuant to the teachings of the present invention may be readily understood by one skilled in the art, with reference being had to the following detailed description of several preferred embodiments, thereof taken in conjunction with the accompanying drawings in which identical reference numerals are used throughout the several views to refer to like elements, and in which.

DETAILED DESCRIPTION OF THE DRAWINGS

Figure 1:
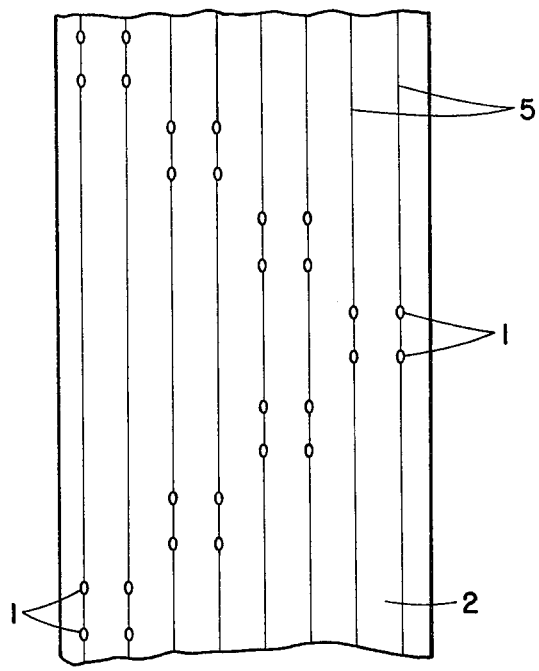
FIGS. 1 through 4 illustrate various geometric arrangements of seeds in different types of seed carriers.

The process of the invention will be illustrated by the following description of preparations of different seed carriers.

Pelletted tobacco seeds with a low humidity, so that the possibility of germination is maintained to the stage of seeding out, were applied to a suitable support paper web consisting of paper of the commerical quality of "drinking-straw paper", with a weight of 20 g/m$^2$ and a thickness of 0.03 mm, with a breaking load of 1200 ponds and an ash content of 19 g/m$^2$, and an average fibre length of 1 mm, with a width of 30 cm. The seeds were arranged in 10 juxtaposed rows with a row spacing of 3 cm, the seeds being continuously supplied with a length spacing of 2.5 to 3 cm by a slight superatmospheric pressure from the holes of a revolving roller, to which the seeds were adhered by a slightly reduced pressure. The pelletted seeds had a diameter of about 1.5 mm.

A porous covering paper, with a weight of 18 g/m$^2$ and a thickness of 0.01 mm and a pore volume for air of 30%, related to the paper surface, was adhered at a position disposed about 10 cm towards the rear of the seed roller by applying pressure to the lower paper web. A speed of each web was 1000 m/h.

The bonding of the tobacco seed grains was effected in such a way that each second row was offset so that the seed grains of one row were staggered by half the spacing relatively to the grains of the adjacent rows and, as a consequence, a triangular adhesive bonding in the form of scalene triangles was established.

The adhesive substance used contained dextrin and had a high solid content, the adhesive being applied such that the amount of water applied to the carrier was about 1.5% by weight based on the total weight of the paper webs, including the seeds, thereby subsequent drying was superfluous.

The warm adhesive solution was applied in three closely adjacent rows, each with a total width of 10 mm and an external spacing of the rows of 3 cm, to the bottom paper web and the seed grains were separately adhered with a specific spacing, e.g. 3 cm.

Simultaneously, a water-storing substance, phosphate starch (commercial product of Henkel & Cie, Düsseldorf), was supplied from above in a quantity of 8 g/m$^2$ for powder-coating purposes which was sufficient to increase the water content of the seed carrier by 30 to 50%.

The water capacity may also be increased to higher values, such as up to 80 to 100%, by increasing the quantity of water-storing substances.

In a second embodiment a finely powdered mixture of phosphate starch and bentonite (in the ratio 5:1) was scattered in an amount of 12 g/cm$^2$ over the porous covering layer and from above on a position disposed about 20 cm behind the paper bonding and the powder was incorporated into the pores by vibration of the carrier. The endless paper web was reeled in lengths of 500 to 1000 meters or was cut into component lengths of 10 meters.

In the preparation of another seed carrier in accordance with the foregoing method, begonia seeds were employed with a length spacing of the seeds of about 1 cm and a distance between the rows of 2 cm, the displacement of the seeds in the adjacent rows being the same as above.

In order to promote the growth of the seedlings, however, a concentrated solution of adhesive substance which additionally contained a practically cold-saturated nutrient solution with a content of N, P, K and Mg-compounds and with a content of known microelements, such as boron and heavy metal ions. The amount of nutrient solution was 20% by weight of the adhesive solution.

The width of the laminar seed support or carrier may be greater than 30 cm, but it may also be substantially narrower, for example, reduced to a strip width down to about 1 cm.

The presence of the strip of adhesive substance having for example a width of 1 cm, prevents any movement of the seeds but also becomes moist, quickly dissolving on contact with moisture and therefore does not inhibit the germination of the seedling.

The grains of tobacco seeds in the seed carrier prepared above formed seedlings within 14 to 21 days. The seedlings do not have to be singled out before transplanting and are able to develop to an optimum degree within the initial period of growth to form plants of uniform size. A considerable saving in labour is achieved in the thinning of the seedlings is unnecessary. On planting the laminar paper web having different properties as regards the bottom and top paper webs quickly softens and is decomposed in a few days.

The seed carriers of the invention also offer the advantage that the thin covering layer consisting of porous cellulose wadding with a high water capacity, as a result of adding the water-storing substances, permits at the commencement of germination the action of sunlight and hence photosynthesis for the growth and establishment of the plants. This advantage is of particular importance in connection with the germination of small seeds, which germination is assisted by the action of light, such as for example begonia seeds.

The seeds may be positioned in the seed carriers of the invention to establish defined, geometrical fibres, such as squares, triangles and circles. Consequently, it is possible to adapt the development of plants to the properties and the size of the plants and also to use seed of different types and varieties of plants in a single row or in all rows. The seed carriers are particularly suitable for seeds of those plants for which a precultivation or treatment in a nursery of the young plants is ncessary, e.g. cabbage, celery, lettuce, tobacco, pansy and petunia.

Furthermore it is possible for crystalline or granular additives to be placed in rows between seeds or in rows adjacent to rows of seeds. These additives may be the seed substances which promote the germination of the seed and the growth of the young plant or to suppress the germination of weed seeds between the rows by herbicides.

The method of the invention thus offers a considerable flexibility in the use of the laminar seed support with seed grains of different types and varieties of plants under various biological conditions.

Figure 2:
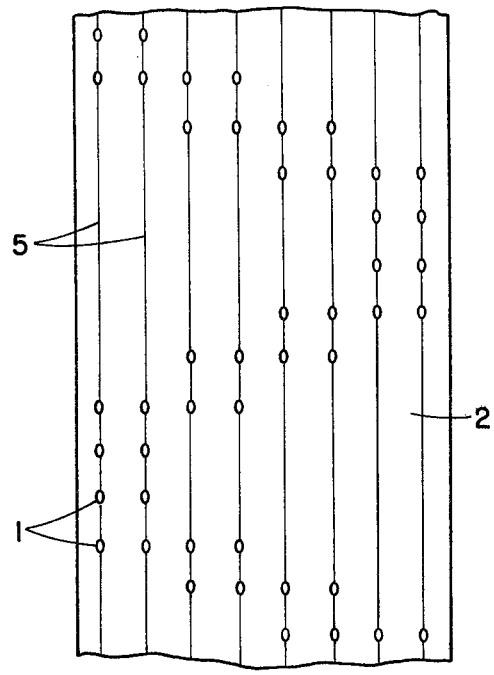
Figure 3:
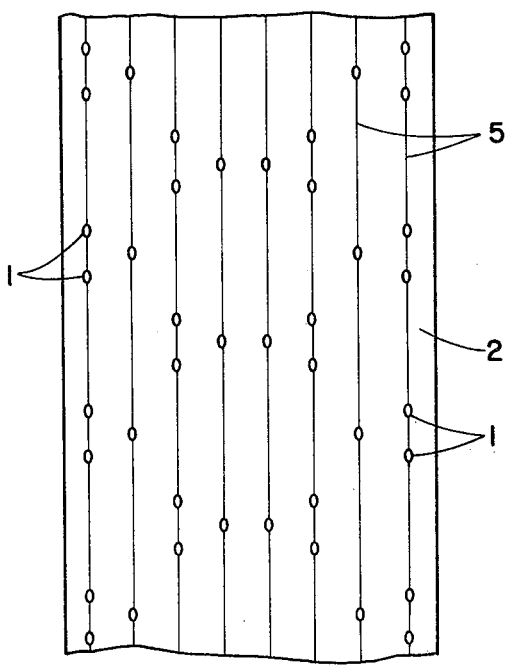
Figure 4:
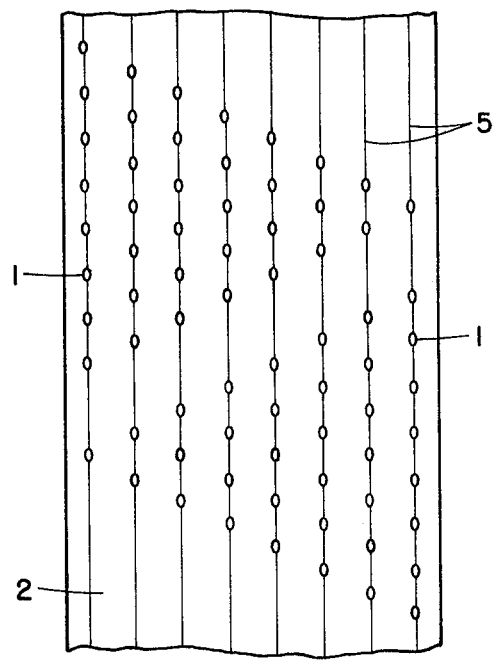

FIG. 1 illustrates one possible geometric arrangement of seed grains in which the grains are placed in the seed carrier in small rectangular patterns, and the rectangular patterns are formed into a larger, triangular or sawtooth pattern. Rows of adhesive 5 are laid down in the seed carrier to maintain the seeds in their proper positional patterns. FIG. 2 is another possible geometric arrangement in which the seeds are arranged in small rectangular patterns, and the small rectangular patterns are positioned along the carrier in a larger, curved sinusoidal pattern. FIG. 3 illustrates yet another possible arrangement for seeds in a seed carrier in which the seeds are positioned in small triangular patterns, which are in turn arranged in a large rectangular pattern on the carrier. FIG. 4 is another possible arrangement in which the seeds are arranged in parallel rows having equal spacings therebetween, with the patterns of the rows forming large, mutually displaced triangles.

What we claim is:

1. A method of preparing a laminar seed carrier in which a support comprising a paper web of tangled short, smooth individual fibres is provided with at least one patch of an adhesive substance, said support paper web having a weight of 15 to 25 g/m$^2$, a thickness of 0.01 to 0.05 mm, a breaking load of 1000 to 1500 pounds and ash content of 15 to 23 g/m$^2$, seeds are applied to the patch or patches of adhesive substance, an upper paper web comprising a porous web having a lower weight than the support paper web is placed over the seeds and bonded to the support paper web and is treated simultaneously with one or more powdered water-storing substances to incorporate the powdered water-storing substances within the pores of the upper paper web, said upper paper web comprising cellulose wadding having a weight of 16 to 19 g/m², a thickness of 0.005 to 0.02 mm and a pore volume for air of more than 20%, related to the paper surface.

2. A method as claimed in claim 1 in which the support paper web has an average fibre length of 1 mm with a random distribution, and with limit values from 0.1 to 2.5 mm.

3. A method as claimed in claim 1 in which the upper paper web has an average fibre length of from 2 to 4 mm, with limit values of 0.5 to 7 mm.

4. A method as claimed in claim 1 in which the water-storing substance is an alginate, cellulose, phosphate starch or bentonite.

5. A method as claimed in claim 1 in which the adhesive substance has a high solids content and is used in such a quantity that the amount of water that is added to the carrier is 1 to 2% by weight of the total weight of the two paper webs and the seeds grains thereby a subsequent drying operation is unnecessary.

6. A method as claimed in Claim 1 in which an aqueous solution of substantially cold-saturated plant nutrients is added to the adhesive substance in an amount of from 10 to 30% by weight.

7. A method as claimed in claim 1 in which the adhesive substance is applied to the support paper web in parallel strips.

8. A method as claimed in claim 1 in which the seeds are adhered on the corners of squares which are disposed side by side or offset from one another, or on the corners of equilateral or scalene triangles which are disposed side by side or offset from one another.

9. A method as claimed in claim 1 in which the seeds are adhered in circular formation or at intervals around central points disposed in rows.

10. A method as claimed in claim 1 in which the seeds are natural, pelletted, granulated, incrustated or chemically treated seed.

11. A method as claimed in claim 1 in which the seeds applied are of different types or species of plants.

12. A method as claimed in claim 11 in which the seeds applied in a row are of different types or species of plants.

13. A method as claimed in claim 11 in which the seeds applied consist of a mixture of types or species of plants in single rows or in all rows.

14. A method as claimed in claim 1 in which crystalline or granulated additives selected from plant nutrients, protectives, growth substances, hormones or herbicides, separately or mixtures thereof are additionally applied to the patch or patches of adhesive material.

15. A method as claimed in claim 14 in which the crystalline or granulated additives are placed in rows between seeds or in separate rows adjacent rows of seeds.

16. A method as claimed in claim 1 in which the seeds are of those types of plants for which a pre-cultivation or treatment in a nursery of the young plants is necessary.

17. A method as claimed in claim 16 in which the seeds are cabbage, celery, lettuce, tobacco, pansy or petunia seeds.

18. A method as claimed in claim 1 in which the two paper webs are processed to form a carrier at a speed between 500 and 3000 m/h.

19. A laminar seed carrier comprising a support paper web of tangled short, smooth individual fibres, bearing at least one patch of an adhesive substance upon which seeds are bonded and an upper paper web, said support paper web having a weight of 15 to 25 g/m², a thickness of 0.01 to 0.05 mm, a breaking load of 1000 to 1500 pounds and an ash content of 15 to 23 g/m², comprising a porous web having a lower weight than the support web covering the seeds and being bonded to the support web, the upper paper web having one or more powdered water-storing substances entrapped within its pores, said upper paper web comprising a cellulose wadding having a weight of 16 to 19 g/m², a thickness of 0.005 to 0.02 mm and a pore volume for air of more than 20%, related to the paper surface.

20. A laminar seed carrier as claimed in claim 19 in which the support paper web has an average fibre length of 1 mm with a random distribution, and with limit values from 0.1 to 2.5 mm.

21. A laminar seed carrier as claimed in claim 19 in which the upper paper web has an average fibre length of from 2 to 4 mm, with limit values of 0.5 to 7 mm.

22. A laminar seed carrier as claimed in claim 19 in which the water-storing substance is an alginate, cellulose, phosphate starch or bentonite.

23. A laminar seed carrier as claimed in claim 19 in which the adhesive substance has a high solids content and is used in such a quantity that the amount of water that is added to the carrier is 1 to 2% by weight of the total weight of the two paper webs and the seed grains thereby a subsequent drying operation is unnecessary.

24. A laminar seed carrier as claimed in claim 19 in which an aqueous solution of substantially cold-saturated plant nutrients is added to the adhesive substance in an amount of from 10 to 30% by weight.

* * * * *